Sept. 1, 1964   J. T. COCKER   3,147,434
CIRCUIT FOR MEASURING THE TIME SYMMETRY OF WAVEFORM POLARITY
Filed Sept. 27, 1960   2 Sheets-Sheet 1

INVENTOR
JOHN T. COCKER
BY R. B. Ardis
ATTORNEY

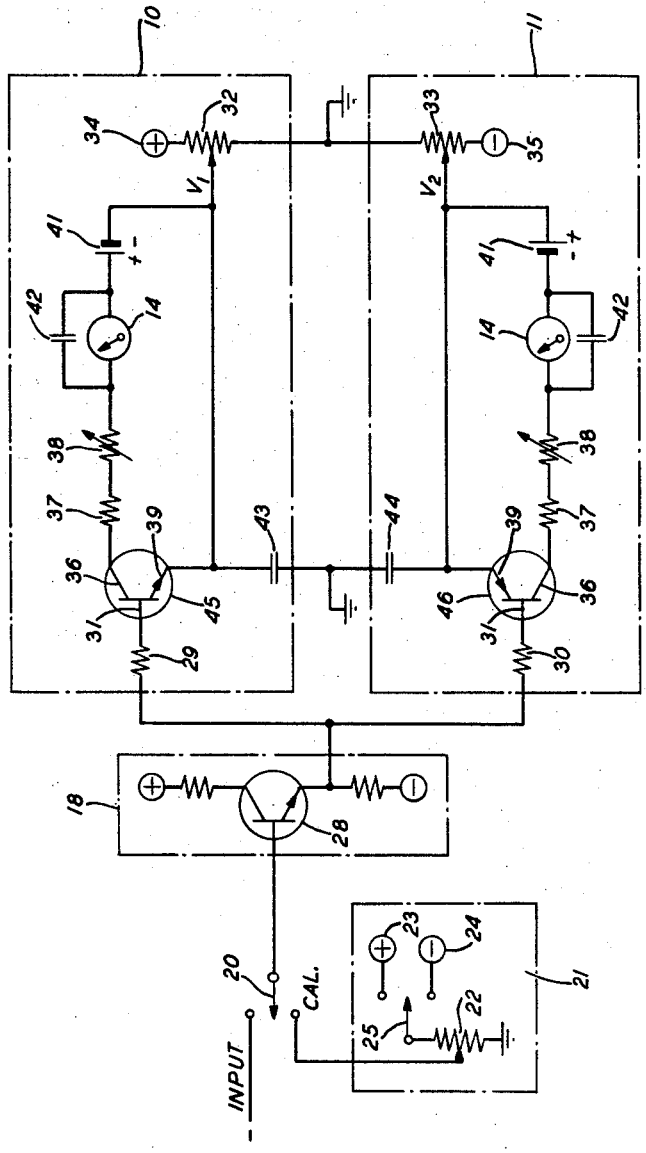

United States Patent Office 3,147,434
Patented Sept. 1, 1964

3,147,434
CIRCUIT FOR MEASURING THE TIME SYMMETRY OF WAVEFORM POLARITY
John T. Cocker, Millington, N.J., assignor to Bell Telephone Laboratories, Incorporated, New York, N.Y., a corporation of New York
Filed Sept. 27, 1960, Ser. No. 58,845
2 Claims. (Cl. 324—77)

This invention relates to systems or determining the characteristics of a waveform, and more particularly to a system for measuring the symmetry of a waveform.

The symmetry of a waveform is defined as the percent of time during which a voltage wave has a specified polarity. The prior art discloses relatively complex apparatus for determining the general characteristics of a waveform, and the symmetry of the waveform can be ascertained by studying the information obtained from such equipment. It is often desirable, however, to be able to directly measure the symmetry of a waveform, and to have such information determinable from a simple measurement of a common circuit parameter.

An object of this invention, therefore, is to obtain a direct measurement of the symmetry of a waveform.

A related object of this invention is to determine the symmetry of a waveform by the measurement of the average value of a current.

A further object of this invention is to obtain such direct measurements, with relatively simple and inexpensive apparatus.

In accordance with the invention two currents are generated; the first of which is proportional to the time the input waveform is positive in polarity, the second proportional to the time the input waveform is negative in polarity. The symmetry of the waveform is directly determined from the values of these currents.

The invention will be more fully comprehended from the following detailed description taken in conjunction with the drawings, in which:

FIG. 3 is a schematic diagram of a symmetry measuring set embodying the invention.

Figure 1:
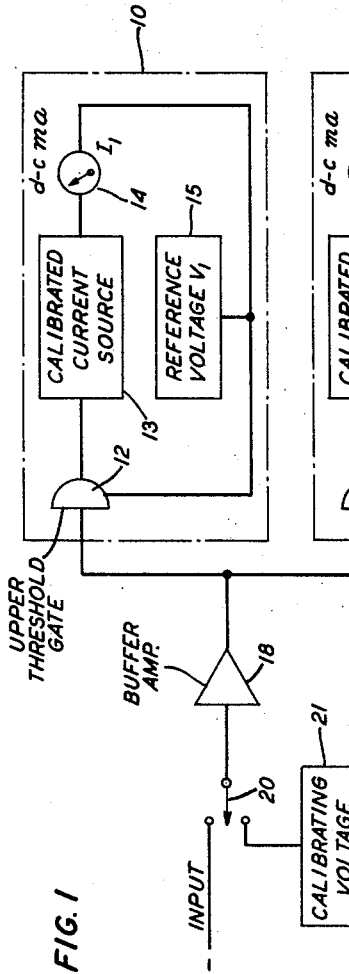
FIG. 1 is a block diagram of a symmetry measuring set embodying the invention.

Symmetry measuring apparatus embodying the invention is shown in FIG. 1. In accordance with the invention a first current proportional to the time the input signal is positive in polarity is generated, and a second current proportional to the time the input signal is negative in polarity is also generated. The symmetry of the waveform is directly determined by measuring one or both of these currents.

Figure 2:
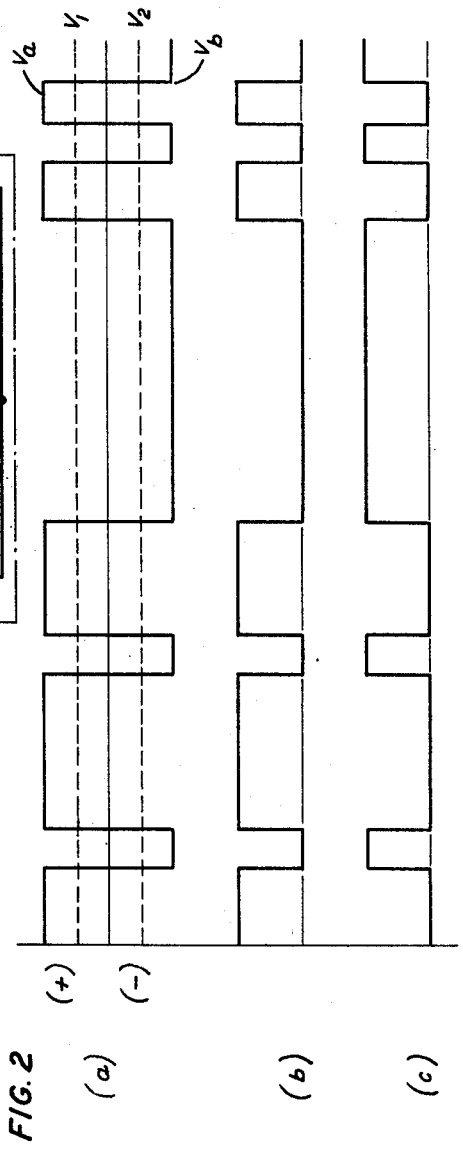
FIG. 2 illustrates some waveforms useful in explaining the operation of the invention.

Specifically, with regard to the measuring set shown in FIG. 1, the circuitry is composed of two channels, 10 and 11, for the generation of the above-described currents. Each channel comprises the series connection of a gate 12, a calibrated current source 13, and a direct-current measuring instrument 14. Gate 12 of channel 10, designated the upper threshold gate, is biased by a positive voltage $V_1$ from a reference source 15 so that upper threshold gate 12 will turn on source 13 only when the input waveform is greater in magnitude than $V_1$. The input waveform is applied to channels 10 and 11 by means of a buffer amplifier 18, and gate 12 of channel 11, designated the lower threshold gate, will turn on the calibrated current source 13 of that channel only when the input waveform is more negative than the negative reference voltage $V_2$ of source 19 which biases the lower threshold gate. Reference voltages $V_1$ and $V_2$ are shown in relation to an illustrative square wave input waveform in line (a) of FIG. 2, and these voltages are chosen so that their respective amplitudes are approximately one-half the maximum positive and negative excursions of the square wave. In the case of an input waveform which is not square voltages $V_1$ and $V_2$ are chosen so as to be relatively small voltages of positive and negative polarity. The current flowing in channel 10 is shown in line (b) of FIG. 2, and that flowing in channel 11 is shown in line (c) of FIG. 2.

The average value of the pulse current output of each calibrated current source 13, as determined by a direct-current meter as shown in FIG. 1 or any device capable of determining the average value of a series of current pulses, is proportional to the symmetry of the input waveform, and the symmetry may be directly determined by a simple initial calibration of the measuring set. Switch 20 is initially connected to a calibrating voltage source 21 whose voltage is more positive than the positive reference voltage $V_1$ of reference source 15. The calibrated current source 13 of channel 10 is then adjusted so that the average value of the current in that channel is a current I as read by direct-current measuring circuit 14. The value of the calibrating voltage of source 21 is then changed to a value more negative than the second reference voltage $V_2$ of reference source 19, and the calibrated current source 13 of the channel 11 is adjusted until its average current output is also I.

Under these initial calibrated conditions an input waveform whose symmetry is to be determined may be applied to the circuitry through switch 20 and buffer amplifier 18, and its symmetry directly determined from a reading of the direct-current measuring instruments 14. The percent of time that the unknown input waveform is positive in polarity, T(+), is $$T(+) = 100 \frac{I_1}{I} \text{ percent}$$

where $I_1$ is the average value of the current output of the first calibrated circuit source. Similarly the percent of time that the input waveform is negative, T(−), is $$T(-) = 100 \frac{I_2}{I} \text{ percent}$$

where $I_2$ is the average current output of the second calibrated current source. By making current $I=1$ unit the meters may be directly calibrated in percent of time that the input signal is positive or negative. In addition it is easily seen that if the time of transition of the square wave input signal from positive to negative values is extremely short relative to the time between such crossings or if $V_1$ and $V_2$ are chosen to be of relatively small value then $T(+) + T(-) = 100$ percent and in such a case the reading of the second meter is unnecessary.

The circuitry shown in FIG. 1 is illustrated schematically in FIG. 3. The calibrating voltage source 21 comprises a potentiometer 22, a positive source of voltage 23, a negative source of voltage 24, and a switch 25 for switching between these two voltages. Buffer amplifier 18 is a transistor emitter follower circuit whose emitter 28 is connected to each of the channels 10 and 11 by means of resistors 29 and 30, respectively. Resistors 29 and 30 maintain the input impedance of the measuring set at a relatively high level and reduce the tendency of the measuring set to "load down" the input signal.

The reference voltages $V_1$ and $V_2$ are derived from a pair of potentiometers 32 and 33, each of which has one terminal connected to ground potential and the other terminal connected to a voltage source. Potentiometer 32 is connected to a source of positive voltage 34 so that voltage $V_1$ is obtained at the movable contact of potentiometer 32, while potentiometer 33 is connected to a source of negative voltage 35 to obtain voltage $V_2$.

The threshold gate and calibrated current source in each channel is a transistor whose base is connected to the emitter 28 of the emitter follower buffer amplifier 18 and whose collector 36 is connected, by means of the series combination of fixed resistor 37 and variable resistor 38 to one terminal of a direct-current measuring device 14. The emitter 39 of each transistor is connected to the source of reference voltage $V_1$ or $V_2$ in its channel, and to one terminal of a biasing battery 41. The second terminal of the biasing battery 41 is connected to the second terminal of the direct-current measuring circuit 14, which is shunted by a capacitor 42 when the measuring circuit 14 is a direct-current meter so as to minimize the effect of the inductance of the meter movement. The emitters 39 are also connected to ground by means of capacitors 43 and 44 which hold the reference voltages constant during transitions of the input signal.

Transistor 45 of channel 10 is of the n-p-n type, and biasing battery 41 is, therefore, poled so that its positive terminal is connected, by meter 14 and resistors 37 and 38, to the collector electrode 36 and its negative terminal connected to the emitter electrode. Under these conditions a positive pulse derived from the buffer amplifier 18 saturates the transistor and a constant current flows. Transistor 46 of channel 11 is of the p-n-p type and is saturated when a negative pulse is applied to its base. Battery 41 of channel 11 is connected with its positive terminal connected to the emitter 39 of transistor 46 and its negative terminal connected by means of meter 14 and resistors 37 and 38 to the collector 36 of the transistor.

The initial calibration is achieved by first switching switch 20 to the CAL. position and switching switch 25 to positive voltage source 23. The potentiometer 22 is adjusted so that the voltage at the movable contact is greater than $V_1$ and variable resistor 38 of channel 10 is adjusted until a current I is read on the direct-current measuring device 14 of that channel. Then switch 25 is set to negative voltage 24 and potentiometer 22 adjusted to obtain a voltage more negative than $V_2$. Variable resistor 38 is then adjusted until a current I is read on the direct-current measuring device 14 of channel 11. As above explained when an unknown waveform is applied to the input of the measuring set its symmetry is directly determined from a reading of one or both of the measuring devices.

As above described voltages $V_1$ and $V_2$ are set at values relatively close to zero voltage when the input waveform whose symmetry to be measured is not a square wave. Voltages $V_1$ and $V_2$ must be set at these values in order to obtain a measurement of the symmetry, as defined in this application, of such a non-square wave input waveform. The invention may also be used to determine the percentages of time during which a non-square wave input waveform exceeds positive and negative reference voltages. In such a case voltages $V_1$ and $V_2$ of sources 15 and 19, respectively, would, of course, be set to the desired reference voltages, and the readings of the direct-current measuring devices 14 would then indicate the percentage of times that the non-square wave input waveform exceeds these reference voltages. The ratio of these readings might then be considered to be a measure of the symmetry of the waveform. In such a case the sum $T(+)+T(-)$ will not in general equal 100 percent and the difference of this sum from 100 percent is equal to the transition time of the input waveform between the reference voltages.

It is to be understood that the above-described arrangements are illustrative of the application of the principles of the invention. Numerous other arrangements may be devised by those skilled in the art without departing from the spirit and scope of the invention.

What is claimed is:

1. A measuring set for determining the symmetry of the waveform of an input signal comprising, in combination, a source of a fixed reference voltage of positive polarity, a current source, gating means having an input connected to receive said input signal and an output connected to said current source to actuate said current source when said input signal is more positive than said fixed reference voltage, a source of a second fixed reference voltage of negative polarity, a second current source, second gating means having an input connected to receive said input signal and an output connected to said second current source to actuate said second current source when said input signal is more negative than said second reference voltage whereby the currents generated by said first and said second current sources are respectively proportional to the percent of time said input signal is of positive polarity and of negative polarity.

2. A measuring set for determining the symmetry of the waveform of an input signal comprising, in combination, an emitter-follower transistor amplifier connected to receive said input signal, a source of a fixed reference voltage of a positive polarity, a first current source including a transistor connected to the emitter of said amplifier and biased by said fixed reference voltage to generate a constant current when said input signal is more positive than said fixed reference voltage, a source of a second fixed reference voltage of negative polarity, a second current source including a transistor connected to the emitter of said amplifier and biased by said second reference voltage to generate a constant current when said input signal is more negative than said second reference voltage, and means to measure the average value of the current generated by said first current source and the average value of the current generated by said second current source.

References Cited in the file of this patent

UNITED STATES PATENTS

| | | |
|---|---|---|
| 2,497,693 | Shea | Feb. 14, 1950 |
| 2,719,289 | Barstow | Sept. 27, 1955 |
| 2,806,205 | Donath | Sept. 10, 1957 |
| 2,849,183 | Kuck | Aug. 26, 1958 |
| 2,858,425 | Gordon | Oct. 28, 1958 |
| 2,883,615 | Gilbert | Apr. 21, 1959 |
| 2,923,820 | Liguori et al. | Feb. 2, 1960 |
| 2,964,656 | Bissell et al. | Dec. 13, 1960 |
| 2,970,261 | Zoll | Jan. 31, 1961 |
| 2,986,655 | Wiseman et al. | May 30, 1961 |
| 2,992,384 | Malbrain | July 11, 1961 |
| 3,017,521 | Herstedt | Jan. 16, 1962 |
| 3,072,895 | Kaufman | Jan. 8, 1963 |
| 3,076,901 | Rubin et al. | Feb. 5, 1963 |
| 3,097,307 | Bonn | July 9, 1963 |